United States Patent [19]

Itaba et al.

[11] Patent Number: 4,636,340
[45] Date of Patent: Jan. 13, 1987

[54] METHOD OF PRODUCING CROSSLINKED POLYETHYLENE STRETCHED FILM

[75] Inventors: Yasushi Itaba, Tokyo; Tadao Yoshino, Saitama; Yutaka Yoshifuji, Saitama; Keichiro Saito, Saitama; Jyoichi Tabuchi, Saitama, all of Japan

[73] Assignee: Toa Nenryo Kogyo Kabushiki Kaisha, Tokyo, Japan

[21] Appl. No.: 682,864

[22] Filed: Dec. 18, 1984

[30] Foreign Application Priority Data

Jan. 23, 1984 [JP] Japan .................................. 59-8418

[51] Int. Cl.⁴ ...................... B29C 35/08; B29C 55/12
[52] U.S. Cl. .................................. 264/22; 522/161; 525/191; 525/194; 264/171; 264/211; 264/288.4; 264/289.3
[58] Field of Search ............... 264/22, 288.4, 289.3, 264/211, 171; 525/191, 194; 522/161

[56] References Cited

U.S. PATENT DOCUMENTS

| | | | |
|---|---|---|---|
| 2,936,261 | 5/1960 | Cole | 264/22 |
| 3,187,982 | 6/1965 | Underwood et al. | 264/288.4 |
| 3,201,506 | 8/1965 | Bills | 264/289.3 |
| 3,448,182 | 6/1969 | Derbyshire et al. | 264/22 |
| 3,563,870 | 2/1971 | Tung et al. | 264/22 |
| 3,886,056 | 5/1975 | Kitamaru et al. | 264/22 |
| 4,101,699 | 7/1978 | Stine et al. | 264/22 |
| 4,226,905 | 10/1980 | Harbourne | 264/22 |
| 4,590,020 | 5/1986 | Itaba et al. | 264/22 |

FOREIGN PATENT DOCUMENTS

| | | | |
|---|---|---|---|
| 1943101 | 3/1971 | Fed. Rep. of Germany | 264/22 |
| 2911777 | 10/1980 | Fed. Rep. of Germany | 264/22 |
| 46-41119 | 12/1971 | Japan | 264/22 |
| 53-75278 | 7/1978 | Japan | 264/22 |
| 54-43274 | 4/1979 | Japan | 264/22 |
| 1270954 | 4/1972 | United Kingdom . | |
| 2040804A | 9/1980 | United Kingdom | 264/22 |

OTHER PUBLICATIONS

Abstracts: Japanese Patent Publication No. 37-18893; Japanese Laid-Open Nos. 51-126269, 52-37981, 54-48865, 54-65775, 54-78743, 54-102373, 55-55829.

Primary Examiner—Jeffery Thurlow
Attorney, Agent, or Firm—R. L. Graham; J. F. Hunt

[57] ABSTRACT

An oriented film is prepared by crosslinking a sheet of polyethylene (preferably HDPE) containing particulate inorganic slip and antiblock additions to provide maximum crosslinking at the surfaces of the sheet and minimum orientation at its middle layer portion, and thereafter heating and stretching the film to obtain an oriented HDPE of high clarity film of improved moisture proof.

7 Claims, No Drawings

4,636,340

METHOD OF PRODUCING CROSSLINKED POLYETHYLENE STRETCHED FILM

BACKGROUND OF THE INVENTION

The present invention relates to polyethylene stretched film, and more particularly to polyethylene stretched film which is superior in moistureproofness, slip properties, and anti-blocking.

Heretofore, films of medium- and low-pressure-process polyethylenes have been hardly used in application areas where display effects are required, despite their superior characteristic properties, mainly because they are poor in clarity. For the improvement of clarity, there have been proposed various kinds of polyethylene stretched films which underwent crosslinking by irradiation. This method improves the film clarity but does not improve moistureproofness, slip properties, and anti-blocking sufficiently.

SUMMARY OF THE INVENTION

In order to overcome the above-mentioned disadvantage and to develop polyethylene film having a high degree of moistureproofness and anti-blocking and a proper level of slip properties without sacrificing clarity, the present inventors carried out a series of researches. As the result, they completed this invention.

The present invention relates to polyethylene stretched film produced by crosslinking and then stretching a sheetlike or tubular molded item composed of 100 parts by weight of polyethylene resin and 0.02 to 1 part by weight of inorganic compound, said crosslinking being performed in such a manner that the degree of crosslinking decreases along the inward direction of the thickness of the molded item, wherein the inorganic compound is one which is selected from the group consisting of zeolite, silica, alumina, and bentonite. The stretched film has a value of water vapor transmission (Y) lower than that defined by the equation below:

$$Y = 17X^{-\frac{1}{2}}$$

(where Y is water vapor transmission (g/m$^2$/24 h) and X is the thickness ($\mu$m) of the stretched film.) a coefficient of friction lower than 0.6 (as the measure of slip properties), and a value of anti-blocking lower than 50 g/cm$^2$.

The stretched film is produced by making a sheetlike or tubular molded item composed of polyethylene resin and inorganic compound and then crosslinking said molded item in such a manner that the degree of crosslinking decreases along the inward direction of the thickness of the molded item, and finally stretching the molded item in at least one direction, preferably more than three times, at a temperature preferably below the melting point of the resin.

DESCRIPTION OF THE PREFERRED EMBODIMENTS

The polyethylene resin used in this invention includes crystalline polyethylene produced by the medium- or low-pressure process. The preferred polyethylene is high density polyethylene (HDPE). It has a density greater than 0.935 g/cc, and preferably greater than 0.950 g/cc, and a melt index (abbreviated as MI hereinafter) greater than 0.05 g/10 min, and preferably from 0.5 to 20 g/10 min. It also includes a mixture of said polyethylene with a small amount of low-density polyethylene or other polyolefins. The polyethylene resin may be incorporated with an antioxidant, UV absorber, antistatic agent, pigment, dye, etc. which are in general use.

The inorganic compound used in this invention includes, for example, metal oxides such as magnesium oxide, calcium oxide, aluminum oxide (alumina), silicon dioxide (silica), and titanium dioxide; metal hydroxides such as magnesium hydroxide, calcium hydroxide, aluminum hydroxide, and ortho-titanic acid; metal carbonates such as potassium carbonate, sodium bicarbonate, sodium carbonate, magnesium carbonate, and calcium carbonate; metal sulfate such as magnesium sulfate, calcium sulfate, barium sulfate, and aluminum sulfate; silicates such as sodium metasilicate, anhydrous sodium silicate, lithium metasilicate, anhydrous lithium silicate, potassium metasilicate, anhydrous potassium silicate, magnesium silicate, magnesium metasilicate, calcium, silicate, and aluminosilicate; and other compounds such as zeolite, mica, talc, bentonite, and hydrotalcite. Preferable among these inorganic compounds are alumina, silica, zeolite, and bentonite, and particularly preferable is zeolite. These inorganic compounds may be either natural ones or synthetic ones, and a mixture thereof may be used.

The inorganic compound should have an average particle diameter below 20 $\mu$m, and preferably from 0.1 to 10 $\mu$m. One having an average particle diameter greater than this limit is effective for slip properties and anti-blocking of film but is deleterious to clarity. The inorganic compound is added in an amount of 0.02 to 1 part by weight, preferably 0.05 to 0.5 parts by weight, for 100 parts by weight of polyethylene resin. When added in an amount less than 0.02 parts by weight, the inorganic compound is not effective in improving slip properties and anti-blocking. On the other hand, the inorganic compound in excess of 1 part by weight extremely aggravates clarity and lowers moistureproofness. The film should have a value of less than 10%, preferably less than 7%, and most preferably less than 5%.

The production of the film of this invention starts with the molding of flat or tubular film, which includes the steps of dry-blending a polyethylene resin with an inorganic compound, melt-mixing the dry blend, supplying the composition to an ordinary extruder, extruding the composition, and cooling the extrudate. The tubular film may be produced by extrusion from an annular die, and the flat film may be produced by extrusion from a T-die or by cutting one edge or both edges of the tubular film. The flat or tubular film should be thick enough to permit crosslinking to take place in such a manner that the degree of crosslinking decreases along the inward direction (from both sides) of the thickness of the film. The thickness of the film is determined depending on the draw ratio of the thickness of stretched film. It is usually 210 to 2000 $\mu$m, and preferably 400 to 1000 $\mu$m.

According to this invention, the flat or tubular film of polyethylene resin should be crosslinked in such a manner that the degree of crosslinking decreases along the inward direction (from both sides) of the thickness of the film. The highest degree of crosslinking at the surface layer portions of the film should be higher than 5%, preferably 20 to 70%, in terms of gel fraction. The lowest degree of crosslinking at the middle layer portion of the film should be 0 to 5%. In the case where the film is crosslinked to constitute the structure of crosslinked layer/uncrosslinked layer/crosslinked layer along the direction of the thickness of the film, with the lowest degree of crosslinking being 0% in terms of gel fraction, the thickness of the crosslinked layers at both sides should be 0.1 to 10 times that of the uncrosslinked layer. The crosslinked layers at both sides should preferably have the same degree of crosslinking.

If the crosslinking is not accomplished in such a manner that the degree of crosslinking decreases along the inward direction of the thickness of the film, and if the lowest degree of crosslinking is in excess of 5% in terms of gel fraction, the resulting stretched film is not improved in moistureproofness, which is the major objective of this invention, although it is improved in clarity and uniform stretching can be performed. If the degree of crosslinking in both surface layers is lower than 20% in terms of gel fraction, uniform stretching cannot be performed and the resulting stretched film is not improved in clarity and moistureproofness. On the other hand, if it is higher than 70%, smooth stretching is impossible due to film breakage. Furthermore, if the film is uniformly crosslinked across its thickness, the resulting stretched film is not improved in moistureproofness, although it is improved in clarity and stretching can be performed uniformly. If the film is crosslinked only half the thickness thereof, the film will easily break in the stretching process. If the film is entirely crosslinked in such a manner that the degree of crosslinking decreases across the thickness of the film from one side to the other, the resulting stretched film is not sufficiently improved in moistureproofness and clarity.

The gel fraction is the quantity of insoluble matters which are left undissolved when the sample is extracted with boiling p-xylene.

The crosslinking as mentioned above may be accomplished by irradiating both sides of the film with electron rays, or by multilayer coextrusion of polyethylene resin incorporated with a crosslinking agent.

The irradiation with electron rays may be accomplished with a dosage of 5 to 50 Mrad, preferably 15 to 30 Mrad, depending on the film thickness and the kind, molecular weight, and molecular weight distribution of the resin used. Both sides of the flat film or the internal and external sides of the tubular film may be irradiated simultaneously or one after another or repeatedly several times. The film being irradiated may be in the molten state (immediately after extrusion) or in the cooled and solidified state. The dosage should preferably be the same for both sides of the flat film or for the internal and external sides of the tubular film. The penetrating power of electron rays may be properly adjusted by controlling the applied voltage or by masking with a shield.

The proper dosage of electron rays may be found by the following procedure. Sheets of thin film are tightly placed one over another as many as necessary to make a test piece which has approximately the same thickness as the film to be irradiated. If the thickness of the film to be irradiated is, for example, 500 $\mu$m, 25 sheets of 20 $\mu$m thick film are placed one over another. Both sides of the test piece are irradiated with electron rays of the same dosage. The crosslinked test piece is taken apart to individual sheets of thin film, and the degree of crosslinking of each sheet of thin film is measured. The results of measurements reveal how the degree of crosslinking varies across the thickness of the test piece. In this way, it is possible to know the relationship among the thickness of the film, the dosage of irradiation, and the degree of crosslinking.

The irradiation of electron rays should preferably be carried out in an atmosphere of nitrogen, argon, helium, and other inert gas. Irradiation of electron rays may be possible to carry out in the presence of air; but it will result in film which is not sufficiently improved in clarity.

The crosslinking by multilayer coextrusion of polyethylene resin incorporated with a crosslinking agent may be accomplished in the following way. A polyethylene resin incorporated with a crosslinking agent such as organic peroxide is supplied to an extruder so that it is formed into the surface layers of flat film or the internal and external layers or tubular film, and the same polyethylene resin as above incorporated with no crosslinking agent or incorporated with a crosslinking agent in such an amount that provides the above-mentioned minimum degree of crosslinking, is supplied to the same extruder as above so that it is formed into the middle layer of flat film or tubular film by coextrusion. The crosslinking takes place during coextrusion which is performed at a temperature higher than the melting point of the resin.

The crosslinked film is subsequently heated and stretched at a prescribed draw ratio in one direction or in two directions by the ordinary roll method, tenter method, or tubular method, whereby there is obtained from the stretched film of this invention. Stretching in two directions may be accomplished simultaneously or successively.

The stretching temperature is usually below the melting point of polyethylene resin, preferably in the range from the softening point to the melting point of the resin. To be specific, it is 70° to 135° C., and preferably 100° to 130° C. If the stretching temperature is below the softening point, it is impossible to perform even and stable stretching because the resin does not soften sufficiently. On the other hand, if the stretching temperature is above the melting point, it is possible to perform uniform stretching but the resulting film is not sufficiently improved in moistureproofness.

The draw ratio should be more than three times, preferably more than four times, in one direction or in the longitudinal and lateral directions. If the draw ratio is less than three times, uniform stretching is difficult to perform the resulting stretched film is not sufficiently improved in moistureproofness and clarity.

The stretched film thus obtained has heat shrinkability. If it is to be used as a substrate of laminated packaging film, it should preferably be subjected to heat-setting at a temperature below the melting point of the stretched film, e.g., at 100° to 140° C., so that heat shrinkage in the lateral direction is reduced to 1.5% or less, preferably 1.0% or less.

The polyethylene stretched film of this invention produced as mentioned above has a value of water vapor transmission (Y) lower than that defined by equation $Y = 17 X^{-\frac{1}{2}}$, a coefficient of friction lower than 0.6, and a value of anti-blocking lower than 50 g/cm$^2$. In addition, it has such a cross-sectional structure that the degree of crosslinking decreases along the inward direction of the thickness of the film. It is stretched more than three times in at least one direction.

The water vapor transmission of the stretched film of this invention has 3.1 g/m$^2$/24 h and 5.4 g/m$^2$/24 h for the thicknesses of 30 $\mu$m and 10 $\mu$m, respectively. Thus, the present invention provides stretched film which has very high moistureproofness, which has never been achieved by the conventional methods, and good slip properties and anti-blocking. These characteristic properties make the stretched film of this invention economical because it is not necessary to increase the thickness of the film in the application areas where high moisture-proofness is required. Moreover, the stretched film of this invention is suitable for automatic packaging and lamination.

The invention is now described with reference to the following examples, in which quantities are expressed as parts by weight. The test methods used are listed below.

(1) Water vapor transmission: JIS Z-0208, temperature 40° C. and relative humidity 90%.

(2) Haze: ASTM D-1003

(3) Slip properties: ASTM D-1894, static coefficient ($\mu$s) of film-to-film friction, and kinetic coefficient ($\mu$k) of film-to-film friction.

(4) Anti-blocking: Two layers of film are aged under a load of 20.8 g/cm² at 50° C. and 50% RH for 24 hours, and the coefficient of friction is measured according to ASTM D-1894.

(5) Gel fraction: ASTM D-2765, method A.

EXAMPLE 1

One hundred parts of high-density polyethylene (density: 0.960 g/ml, MI: 5.2 g/10 min), 0.05 parts of antioxidant [n-oxtadecyl-3-(4'-hydroxy-3',5'-di-t-butylphenyl)-propionate], 0.05 parts of neutralizing agent (calcium stearate), and 0.05 parts of zeolite were dry-blended by using a Henschel mixer. The dryblend was melted, mixed, and pelletized by using an extruder at 220° C. The pellets were formed into 600 $\mu$m thick flat film by T-die extrusion at 220° C.

Both surfaces of the flat film were irradiated with electron rays at the dosage of 20 Mrad each in the nitrogen atmosphere by using an electron ray irradiation apparatus (made by ESI), at 165 kV and 45 mA.

In order to investigate the degree of crosslinking in the surface layers and middle layer of the film, a 600 $\mu$m thick test piece composed of 30 sheets of 20 $\mu$m thick film placed one over another was irradiated with electron rays under the same condition as above, and the degree of crosslinking of each sheet of the thin film was measured. It was found that the degree of crosslinking in the surface layers was 50% in terms of gel fraction and the lowest degree of crosslinking in the middle layer was 0% in terms of gel fraction. The ratio of the thicknesses of the crosslinked layer/uncrosslinked layer/crosslinked layer was 1/2/1.

The crosslinked film was heated to 130° C., and the heated film was stretched four times in the longitudinal direction and then five times in the lateral direction by using a tenter-type biaxial stretching machine. Thus there was obtained a sheet of 30 $\mu$m thick stretched film. Table 1 shows the characteristic properties of this film.

EXAMPLES 2 TO 5

Various kinds of stretched films were prepared in the same way as in Example 1 except that polyethylene resins having the different density and MI were used and the quantity of zeolite was changed. Table 1 also shows their characteristic properties.

EXAMPLES 6 TO 8

Various kinds of stretched films were prepared in the same way as in Example 1 except that polyethylene resins having the different density and MI were used and the quantity and particle size of zeolite were changed. Table 1 also shows their characteristic properties.

EXAMPLES 9 TO 11

Various kinds of stretched films were prepared in the same way as in Example 6 except that zeolite was replaced by silica, alumina, and bentonite, respectively. Table 1 also shows their characteristic properties.

TABLE 1

| | Polyethylene | | Inorganic Compound | | | Stretched Film | | | | |
| | Density | MI | | Average particle | Quantity added | Haze | Coefficient of friction | | Anti-blocking | Moisture-proofness |
| Example | (g/cc) | (g/10 min) | Name | size ($\mu$m) | parts | (%) | ($\mu$s) | ($\mu$k) | (g/cm²) | (g/m²/24 h) |
| --- | --- | --- | --- | --- | --- | --- | --- | --- | --- | --- |
| 1 | 0.960 | 5.2 | Zeolite | 2.7 | 0.05 | 3.6 | 0.29 | 0.34 | 30 | 2.4 |
| 2 | 0.958 | 1.0 | Zeolite | 2.7 | 0.1 | 3.0 | 0.26 | 0.30 | 20 | 2.4 |
| 3 | 0.958 | 1.0 | Zeolite | 2.7 | 0.2 | 4.2 | 0.25 | 0.28 | 5 | 2.4 |
| 4 | 0.958 | 1.0 | Zeolite | 2.7 | 0.4 | 6.8 | 0.24 | 0.25 | 2 | 2.6 |
| 5 | 0.958 | 1.0 | Zeolite | 2.7 | 0.9 | 9.3 | 0.24 | 0.24 | 2 | 2.5 |
| 6 | 0.957 | 0.8 | Zeolite | 1 | 0.2 | 2.9 | 0.30 | 0.29 | 23 | 2.4 |
| 7 | 0.957 | 0.8 | Zeolite | 1 | 0.4 | 4.8 | 0.25 | 0.25 | 10 | 2.4 |
| 8 | 0.957 | 0.8 | Zeolite | 5 | 0.2 | 4.9 | 0.22 | 0.24 | 2 | 2.4 |
| 9 | 0.957 | 0.8 | Silica | 10 | 0.1 | 4.8 | 0.35 | 0.30 | 36 | 2.3 |
| 10 | 0.957 | 0.8 | Alumina | 4 | 0.2 | 5.0 | 0.45 | 0.48 | 45 | 2.4 |
| 11 | 0.957 | 0.8 | Bentonite | 5 | 0.2 | 5.0 | 0.50 | 0.52 | 40 | 2.3 |

COMPARATIVE EXAMPLES 1 TO 5

Examples 1 and 2 were repeated except that zeolite was not added (Comparative Examples 1 and 2), Example 2 was repeated except that zeolite was added in excess of 1 part by weight (Comparative Example 3), and Example 3 was repeated except that zeolite was replaced by oleamide or erucamide (Comparative Examples 4 and 5). Table 2 shows the characteristic properties of the resulting stretched films.

TABLE 2

| | Polyethylene | | Inorganic Compound | | | Stretched Film | | | | |
| Comparative | Density | MI | | Average particle | Quantity added | Haze | Coefficient of friction | | Anti-blocking | Moisture-proofness |
| Example | (g/cc) | (g/10 min) | Name | size ($\mu$m) | parts | (%) | ($\mu$s) | ($\mu$k) | (g/cm²) | (g/m²/24 h) |
| --- | --- | --- | --- | --- | --- | --- | --- | --- | --- | --- |
| 1 | 0.960 | 5.2 | — | — | — | 3.1 | 0.61 | 0.82 | 85 | 2.3 |
| 2 | 0.958 | 1.0 | — | — | — | 2.0 | 3.62 | 4.22 | 100 | 2.2 |
| 3 | 0.958 | 1.0 | Zeolite | 2.7 | 1.3 | 15.0 | 0.23 | 0.23 | 2 | 3.1 |

TABLE 2-continued

| Comparative Example | Polyethylene Density (g/cc) | Polyethylene MI (g/10 min) | Inorganic Compound Name | Inorganic Compound Average particle size (μm) | Inorganic Compound Quantity added parts | Stretched Film Haze (%) | Stretched Film Coefficient of friction (μs) | Stretched Film Coefficient of friction (μk) | Stretched Film Anti-blocking (g/cm$^2$) | Stretched Film Moisture-proofness (g/m$^2$/24 h) |
| --- | --- | --- | --- | --- | --- | --- | --- | --- | --- | --- |
| 4 | 0.958 | 1.0 | Oleamide | — | 0.2 | 2.2 | 0.80 | 0.56 | 90 | 2.2 |
| 5 | 0.958 | 1.0 | Erucamide | — | 0.2 | 2.4 | 0.86 | 0.62 | 100 | 2.2 |

What is claimed is:

1. A method for producing high clarity oriented polyethylene film which comprises
   (a) crosslinking opposite surfaces of a sheet of polyethylene having a density greater than 0.935 and containing from 0.02 to 1 parts by weight per 100 parts by weight of said polyethylene of a particulate inorganic compound selected from the group consisting of zeolite, silica, alumina, and bentonite, having an average particle size less than 20 microns, said crosslinking produces gel fractions in opposite outer layer portions of the sheet of between 20% and 70% and a gel fraction in a middle layer portion of the sheet of between 0 and 5%,
   (b) heating and stretching the crosslinked sheet under conditions to orient the polyethylene molecules thereby producing an oriented film.

2. The method as defined in claim 1 wherein the polyethylene is HDPE.

3. The method as defined in claim 1 wherein the outer layer portions are crosslinked film and the middle layer portion is an uncrosslinked film, and the thickness ratio of the outer layer portion:middle layer portion:outer layer portion thereof ranging between 1:0.1:1 to 1:10:1.

4. The method as defined in claim 1 wherein the sheet is crosslinked by irradiating both surfaces of said sheet.

5. The method as defined in claim 1 wherein the sheet comprises crosslinked layers coextruded onto an uncrosslinked middle layer.

6. The method as defined in claim 3 wherein the sheet has a thickness of from 210 to 2000 microns and the stretching at least in one direction is at least 300 percent.

7. The method as defined in claim 1 wherein the crosslinking is carried out in an inert environment.

* * * * *